Patented Jan. 6, 1953

2,624,679

UNITED STATES PATENT OFFICE 2,624,679

ADHESIVE FROM WHEY AND A METHOD OF MAKING IT

Gottfried L. Tschabold and Delbert L. Mueller, Minerva, Ohio

No Drawing. Application April 26, 1951, Serial No. 223,140

7 Claims. (Cl. 106—139)

The invention relates generally to the art of making adhesives and more particularly to making a liquid adhesive particularly adapted for gluing fibrous products such as paper and the like.

A conventional liquid adhesive for gluing paper tubes, laminating paper sheets, and other similar uses, is made by heating a mixture of powdered yellow dextrine and water to produce a relatively thick solution containing approximately 90% dextrine. This high concentration of dextrine is necessary to produce satisfactory adhesive quality. The mixture requires heating for a substantial period of time during which some water is added from time to time to replace the loss due to evaporation, and it is difficult to control the amount of water so that the resulting solution has the desired concentration.

One disadvantage of this adhesive is the relatively high cost due to the high percentage of dextrine, and another and serious disadvantage is that in order to get satisfactory results, the solution must be maintained hot during its application to the products to be glued.

We have discovered a novel method by which an improved liquid adhesive for gluing paper products and the like can be made, utilizing waste whey such as that derived from cheese making, together with a greatly reduced percentage of dextrine and preferably small percentages of one or two common chemicals. The novel adhesive may be made very cheaply because of the large proportion of waste whey which it contains, and it possesses definite advantages over conventional adhesives in respect to certain of its properties.

It is an object of the present invention to provide a novel process of making a liquid adhesive containing as a principal ingredient waste whey derived from cheese making.

Another object is to provide a novel process of making a liquid adhesive consisting principally of waste whey and dextrine.

A further object is to provide a novel and inexpensive adhesive composition which can be applied at room temperature to paper products and the like for gluing the same.

A still further object is to provide a novel adhesive composition which contains the waste whey from cheese making as a principal ingredient.

These and other objects are accomplished by the method and product of the present invention, preferred embodiments of which are set forth in the following specification as exemplifying the best known mode of carrying out the invention, the scope of the invention being defined in the appended claims.

In carrying out the invention, we use preferably whey which is a by-product of cheese manufacture and normally wasted, as a principal ingredient. The whey is in liquid form and is acid in character, so that it is desirably first neutralized by adding sufficient slaked lime to bring it to normal. This allows subsequent heating without separation.

The neutralized whey is then condensed in the proportion of five parts to one part by weight. Preferably, to accomplish the condensation the neutralized whey is preheated to about 190° F. and then either evaporated under vacuum in a conventional vacuum pan at a temperature of about 120° F., or condensed in an atmospheric continuous condenser at 212° F. In either case the whey is condensed to one-fifth its original weight and is a thick viscous liquid having a somewhat tacky character.

The condensed whey is then mixed with powdered yellow dextrine in the approximate proportions of two parts by weight of whey to one part by weight of dextrine, and this produces a liquid adhesive which is well adapted for gluing paper products. Preferably, small amounts of borax and strong alkali such as caustic soda are also added to improve the product, and the preferred formula is as follows, in percentage by weight:

64.0 per cent condensed whey
29.8 per cent powdered yellow dextrine
2.2 per cent borax
4.0 per cent caustic soda (50% solution)

While we have obtained very satisfactory results with the above percentages, they are approximate, and good results can be obtained even though the percentages of one or more of the ingredients are varied to a limited extent. While, as preferably stated, a good adhesive can be made with approximately two parts by weight of whey and one part of dextrine, we prefer to add the borax and caustic soda in approximately the proportions given to further improve the adhesive. The borax is added as a preservative and carrier, and tends to make the adhesive more smooth and pliable. The caustic soda or other strong alkali, in the approximate proportion given, increases the stickiness of the adhesive and its penetration into the paper products to which the adhesive is applied.

In preparing the adhesive composition it is important that the ingredients be added in the following manner. The condensed whey is first heated to about 90° F. and the powdered yellow dextrine and borax added in the proper proportions stated above. This mixture is then heated to about 194° F. and held at that temperature for approximately thirty minutes, and then allowed to cool to 160° F. The caustic solution is then added to the mixture when it has cooled to 160° F., and the resulting composition is allowed to cool slowly to room temperature, whereupon it is ready for use.

The resulting composition is liquid at room temperature and is water soluble. It is usable without reheating, and is adapted for gluing paper products such as paper tubes, for laminating paper sheets, and for many other kindred uses. The adhesive may also be used as a sizing material, and in many other capacities common to conventional liquid adhesives. Moreover, the improved composition is non-poisonous if taken internally.

In addition to supplanting a large percentage of the dextrine which would other wise be required, the condensed whey has a natural stickiness which aids in producing the required amount of stickiness in the adhesive composition, which possesses the very important and economical property of being usable at room temperatures without reheating.

In the foregoing description, certain terms have been used for brevity, clearness, and understanding, but no unnecessary limitations are to be implied therefrom beyond the requirements of the prior art, because such words are used for descriptive purposes herein and are intended to be broadly construed.

Having now described the invention, the method of making and the composition of preferred embodiments thereof, and the advantageous new and useful results obtained thereby, the new and useful methods and products and reasonable equivalents thereof are set forth in the appended claims.

We claim:
1. The method of making an adhesive from the whey derived from cheese making, which includes neutralizing the whey, condensing the whey to about one-fifth its weight, heating the condensed whey to about 90° F., adding powdered dextrine and borax in the proportions of about 64 parts by weight of condensed whey to 30 parts dextrine and 2 parts borax, heating the mixture to about 194° F. for 30 minutes, then cooling to 160° F. and adding about 4 parts of a 50% solution of caustic soda.

2. The method of making an adhesive from the whey derived from cheese making, which includes neutralizing the whey, condensing the whey to about one-fifth its weight, heating the condensed whey to about 90° F., adding powdered dextrine and borax in the proportions of about 64 parts by weight of condensed whey to 30 parts dextrine and 2 parts borax, heating the mixture to about 160° F., and adding about 4 parts by weight of a 50% solution of caustic alkali.

3. The method of making an adhesive from waste whey, which includes neutralizing the whey, condensing the whey to about one-fifth its weight, heating the condensed whey to about 90° F., adding powdered dextrine and borax in the proportions of about 64 parts by weight of condensed whey to 30 parts dextrine and 2 parts borax, heating the mixture to about 160° F. and adding about 4 parts of a 50% solution of caustic alkali.

4. An adhesive composition consisting of the reaction product of about 2% caustic soda, about 64% by weight raw waste whey condensed 5 to 1 by weight, about 30% dextrine, about 2% borax as a preservative, and about 2% water.

5. An adhesive composition consisting of the reaction product of about 2% caustic alkali about 64% by weight of condensed whey derived from cheese making, about 30% dextrine, about 2% borax as a preservative, and about 2% water.

6. An adhesive composition consisting principally of the reaction product of about 2% alkali condensed whey and dextrine in the proportions of about 2 parts by weight of whey and 1 part by weight of dextrine, and containing borax as a preservative in amounts of the order of 2% by weight of the total.

7. An adhesive composition consisting principally of the reaction product of about 2% caustic soda whey and dextrine in the proportions of about 2 parts by weight of raw whey condensed 5 to 1 by weight, and 1 part by weight of dextrine, and containing borax as a preservative in amounts of the order of 2% by weight of the total.

GOTTFRIED L. TSCHABOLD.
DELBERT L. MUELLER.

No references cited.